United States Patent [19]

Troxler et al.

[11] 4,151,163
[45] Apr. 24, 1979

[54] QUATERNIZED 1-(PYRAZOLINYLPHENYLSULPHONYL)-PIPERAZINES

[75] Inventors: Eduard Troxler; Christian Luthi, both of Basel, Switzerland

[73] Assignee: Ciba-Geigy Corporation, Ardsley, N.Y.

[21] Appl. No.: 857,725

[22] Filed: Dec. 5, 1977

Related U.S. Application Data

[63] Continuation of Ser. No. 663,018, Mar. 2, 1976, abandoned.

[30] Foreign Application Priority Data

Mar. 6, 1975 [CH] Switzerland .................. 2849/75

[51] Int. Cl.$^2$ ................................. C07D 241/50
[52] U.S. Cl. ........................ 260/239.7; 427/158
[58] Field of Search ............................... 260/239.7

[56] References Cited

U.S. PATENT DOCUMENTS 3,598,810  8/1971  Troxler et al. ............... 260/239.7
3,849,406  11/1974  Aebli et al. .................. 260/239.7

*Primary Examiner*—Jose Tovar
*Attorney, Agent, or Firm*—Prabodh I. Almaula

[57] ABSTRACT

(Pyrazolinylphenylsulfonyl)-piperazines of the formula

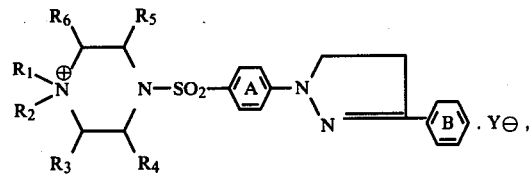

wherein $R_1$ is unsubstituted or substituted alkyl, aralkyl or alkenyl, $R_2$ is unsubstituted or substituted alkyl, aryl or aralkyl $R_3$, $R_4$, $R_5$, $R_6$, $R_7$ and $R_8$ are certain substituents and Y is an anion, their preparation as well as their use as optical brighteners are disclosed.

5 Claims, No Drawings

QUATERNIZED 1-(PYRAZOLINYLPHENYLSULPHONYL)-PIPERAZINES

This is a continuation of application Ser. No. 663,018, filed on Mar. 2, 1976, now abandoned.

The present invention relates to new quaternised 1-(pyrazolinylphenylsulphonyl)-piperazines, to processes for their production, and to their use for the optical brightening of organic materials.

In the U.S. Pat. No. 3,598,810 there are described, as brighteners, 1-(pyrazolinylphenylsulphonyl)-piperazines which are not quaternised. These compounds have the disadvantage that they are not suitable for brightening from the gel phase.

It has now been found that organic materials can be brightened from the gel phase with 1-(pyrazolinylphenylsulphonyl)-piperazines that have been quaternised.

The subject of the present invention is hence new quaternised 1-(pyrazolinylphenylsulphonyl)-piperazines of the formula

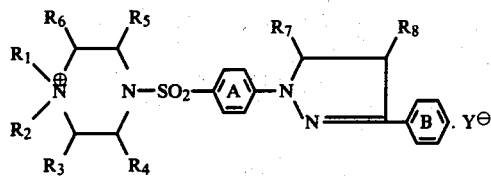 (1)

wherein the rings A and B can contain nonchromophoric and nonionic substituents, and wherein
 $R_1$ represents an unsubstituted or substituted alkyl or aralkyl radical or an alkenyl radical,
 $R_2$ represents an unsubstituted or substituted alkyl, aryl or aralkyl radical,
 $R_3$, $R_4$, $R_5$ and $R_6$ each independently represent hydrogen or halogen, or an alkyl, cycloalkyl, aralkyl or aryl radical,
 $R_7$ represents hydrogen, an unsubstituted alkyl or phenyl radical or a phenyl radical substituted with chlorine, alkyl or alkoxy, or together with $R_8$ a radical of the formula

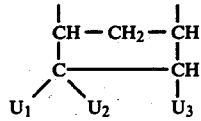

wherein $U_1$ represents hydrogen or cyano, $U_2$ represents hydrogen, cyano, carboxy, carbalkoxy having 2 to 5 carbon atoms, hydroxy-substituted carbalkoxy having 2 to 5 carbon atoms, or carbamoyl, or together with $U_3$ it represents a fused-on benzene radical, and $U_3$ represents hydrogen or carbalkoxy having 2 to 5 carbon atoms, or together with $U_2$ it represents a fused-on benzene radical,
 $R_8$ represents hydrogen or alkyl, or together with the o-position of the ring B an ethylene bridge, or together with $R_7$ the above-given radical, and
 Y represents halogen, an alkylsulphonic acid radical, the phenylsulphonate radical, or a phenylsulphonate radical substituted by halogen and/or lower alkyl.

Suitable nonchromophoric and nonionic substituents are, e.g., alkyl optionally substituted with halogen, hydroxy, alkoxy, cyano, carbalkoxy, carbamoyl, sulphonyl, sulphamoyl or aryl, as well as alkenyl, cycloalkyl, alkoxy, alkoxyalkoxy, aryloxy, aralkoxy, alkenyloxy, aryl, halogen, alkylmercapto, alkenylmercapto, arylmercapto, alkylsulphonyl, arylsulphonyl, cyano, carbalkoxy, carbamoyl or sulphamoyl. Two substituents together can also form in conjunction with an adjacent fused-on cycloalkyl radical or a fused-on non-aromatic heterocycle an additional ring. Preferred substituents are in general alkyl having 1 to 4 carbon atoms, alkoxyalkyl having 2 to 5 carbon atoms, cyclohexyl, alkenyl having 3 or 4 carbon atoms, benzyl, phenyl, fluorine, chlorine, bromine, alkoxy having 1 to 4 carbon atoms, benzyloxy, phenoxy, alkylmercapto having 1 to 4 carbon atoms, alkenyloxy having 3 or 4 carbon atoms, phenylmercapto, alkylsulphonyl having 1 to 4 carbon atoms, phenylsulphonyl, cyano, carbalkoxy having 2 to 5 carbon atoms, carbamoyl and sulphamoyl.

Ring B in preferred compounds is unsubstituted, or substituted by fluorine, chlorine or bromine, preferably by chlorine, or by lower alkyl or alkoxy groups, with chlorine being preferably in the para-position.

$R_1$ and $R_2$ represent in preferred compounds an alkyl group having 1 to 18 carbon atoms, which can be substituted by hydroxyl, cyano or alkoxycarbonyl groups. As aralkyl radical is preferably meant the benzyl group, and as aryl radical $R_2$ the phenyl group, which can be mono- or di-substituted by chlorine, fluorine or lower alkyl or alkoxy groups. An alkenyl group $R_1$ is in particular the allyl group.

$R_3$, $R_4$, $R_5$ and $R_6$ represent in the commercially most interesting compounds lower alkyl radicals, or preferably hydrogen. $R_7$ and $R_8$ represent a lower alkyl group, or preferably hydrogen.

By "lower" in connection with alkyl or alkoxy radicals are meant radicals having 1 to 4 carbon atoms.

Compounds deserving special mention are those of the formula

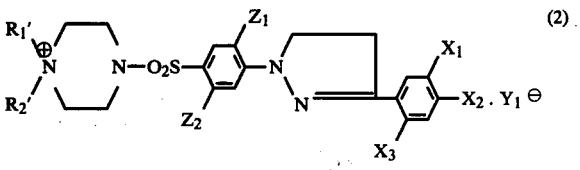 (2)

wherein
 $R_1'$ represents an alkyl radical having 1 to 18 carbon atoms, the benzyl radical, a benzyl radical substituted by chlorine or methyl, a hydroxyalkyl radical having 1 to 4 carbon atoms, a cyanoalkyl radical having 1 to 4 carbon atoms, or a carbalkoxyalkyl radical having a total of 3 to 17 carbon atoms, or the allyl radical,
 $R_2'$ represents an alkyl radical having 1 to 18 carbon atoms, the benzyl radical, a benzyl radical substituted by chlorine or methyl, a hydroxyalkyl radical having 1 to 4 carbon atoms, a cyanoalkyl radical having 1 to 4 carbon atoms, or a carbalkoxyalkyl radical having a total of 3 to 17 carbon atoms, the phenyl radical, or a phenyl radical substituted by chlorine, methyl or methoxy,
 $X_1$ represents hydrogen or chlorine,
 $X_2$ represents hydrogen, chlorine, fluorine, or an alkyl radical having 1 to 4 carbon atoms,
 $X_3$ represents hydrogen, chlorine, or an alkyl radical having 1 to 4 carbon atoms, $Z_1$ and $Z_2$ each independently represent hydrogen, chlorine or fluorine, and $Y_1$ represents halogen, $CH_3 SO_4$, $C_2H_5 SO_4$, or phenylsulphonate which in the phenyl radical is unsubstituted or substituted by chlorine or methyl;

as well as compounds of the formula

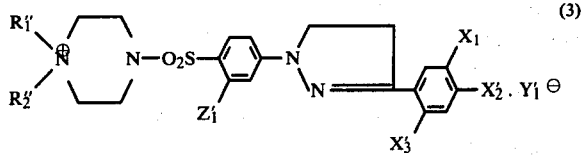

wherein $R_1''$ represents an alkyl radical having 1 to 8 carbon atoms, an alkenyl radical having 3 or 4 carbon atoms, a hydroxyalkyl radical having 1 to 4 carbon atoms, the benzyl radical, or a carbalkoxyalkyl radical having a total of 3 to 7 carbon atoms, $R_2''$ represents an alkyl radical having 1 to 4 carbon atoms, a hydroxyalkyl radical having 1 to 4 carbon atoms, the benzyl radical, the benzyl radical substituted by chlorine or methyl, the phenyl radical, or a phenyl radical substituted by chlorine, methyl or methoxy, $X_1$ represents hydrogen or chlorine, $X_2'$ represents hydrogen or chlorine, $X_3'$ represents hydrogen, or an alkyl radical having 1 to 4 carbon atoms, $Z_1'$ represents hydrogen or chlorine, and $Y_1'$ represents chlorine, bromine, $CH_3 SO_4$, $C_2H_5 SO_4$, phenylsulphonate, or phenylsulphonate substituted in the phenyl nucleus by methyl.

To be emphasised are compounds of the formula

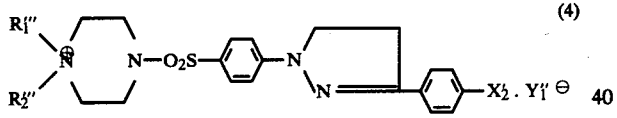

wherein $R_1'''$ represents an alkyl radical having 1 or 2 carbon atoms, the allyl radical, a hydroxyalkyl radical having 1 to 4 carbon atoms, the benzyl radical, or a carbalkoxyalkyl radical having a total of 3 to 7 carbon atoms, $R_2'''$ represents an alkyl radical having 1 to 4 carbon atoms, a hydroxyalkyl radical having 1 to 4 carbon atoms, the benzyl radical, the phenyl radical, or a phenyl radical substituted by chlorine or methyl, $X_2''$ represents hydrogen or chlorine, $Y_1''$ represents chlorine, bromine, $CH_3 SO_4$, $C_2H_5 SO_4$, or phenylsulphonate substituted in the phenyl nucleus by methyl;

as well as the compounds of the formula

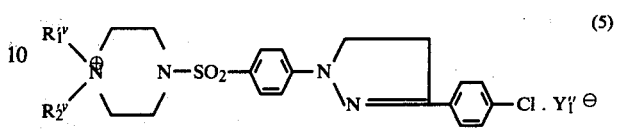

wherein $R_1'^v$ represents an alkyl radical having 1 or 2 carbon atoms, the benzyl radical, the allyl radical, or a carbalkoxyalkyl radical having in all 3 to 5 carbon atoms, $R_2'^v$ represents an alkyl radical having 1 to 4 carbon atoms, the benzyl radical, a hydroxyalkyl radical having 1 to 4 carbon atoms, or the phenyl radical, and $R_1''$ represents chlorine, bromine, $CH_3 SO_4$, $C_2H_5 SO_4$, or phenylsulphonate substituted in the phenyl nucleus by methyl.

Compounds of outstanding interest are those of the formula

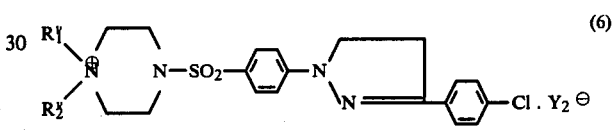

wherein $R_1{}^v$ represents the methyl or ethyl radical, the $\beta$-hydroxyethyl radical, the benzyl radical, the allyl radical or the carbomethoxymethyl radical, $R_2{}^v$ represents the methyl or $\beta$-hydroxyethyl radical, or the phenyl, p-tolyl or p-chlorophenyl radical, and $Y_2$ represents chlorine, bromine, $CH_3SO_4$, $C_2H_5SO_4$ or p-toluenesulphonate.

Of particular practical interest are the compounds of the formula

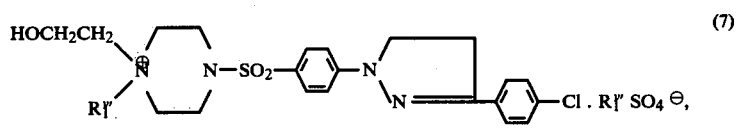

wherein $R_1^{v'}$ represents the methyl or ethyl radical. The following compounds, for example, are embraced by the formulae described in the foregoing:

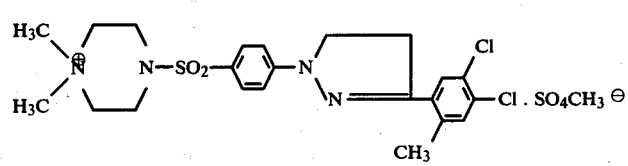

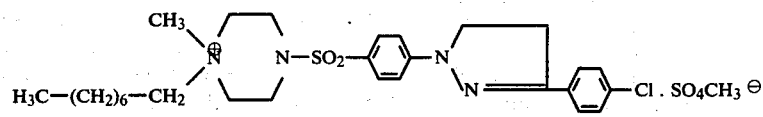

-continued

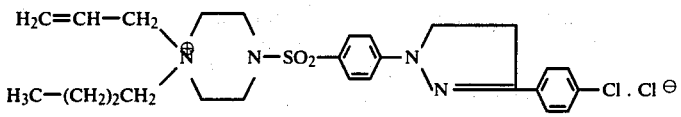

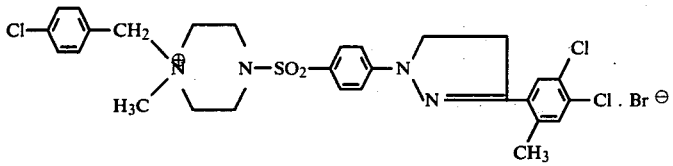

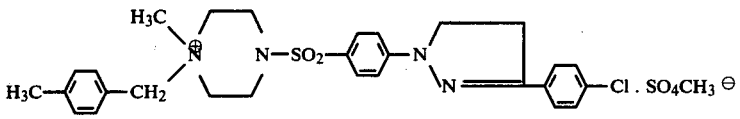

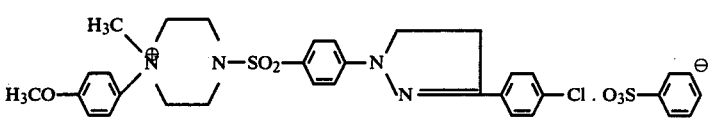

The new compounds defined in the foregoing exhibit in the dissolved or finely dispersed state a more or less pronounced fluorescence. They can be used for optically brightening the most varied synthetic, semi-synthetic or natural organic materials in the textile industry, or substances that contain such organic materials.

In this connection there may be mentioned for example, so far as the optical brightening of the materials is concerned and without any limitation of the range of such materials being intended, the following groups of organic materials:

I. Synthetic organic high-molecular materials
  (a) polymerisation products based on organic compounds containing at least one polymerisable carbon-carbon double bond, i.e. homo- or copolymers thereof, as well as their aftertreatment products, such as cross-linking, graft or degradation products, polymer blends, or products obtained by modification of reactive groups, for example polymers based on $\alpha,\beta$unsaturated carboxylic acids or on derivatives of such carboxylic acids, particularly on acrylic compounds (such as acrylic esters, acrylic acid, acrylonitrile, acrylic amides and derivatives thereof or methacrylic analogues thereof), on olefin hydrocarbons (such as ethylene, propylene, styrenes or dienes, also so-called ABS-polymers); or polymers based on vinyl compounds and vinylidene compounds (such as vinyl chloride, vinyl alcohol and vinylidene chloride);
  (b) polymerisation products obtainable by ring opening, e.g. polyamides of the polycaprolactam type, also polymers that are obtained both by polyaddition and by polycondensation, such as polyethers or polyacetals;
  (c) polycondensation products or pre-condensates based on bi- or polyfunctional compounds having condensable groups, homo- and mixed-condensation products thereof, as well as products of aftertreatment, such as polyamides (e.g. hexamethylenediamine-adipate), maleic resins and melamine resins, pre-condensates and analogues thereof, polycarbonates or silicones;
  (d) polyaddition products such as polyurethanes (cross-linked and non-cross-linked) or epoxide resins.

II. Semi-synthetic organic materials, e.g. cellulose esters of various degrees of esterification (so-called 2½-acetate or triacetate) or cellulose ethers, regenerated cellulose (viscose or cuprammonium cellulose) or the aftertreatment products thereof, and casein plastics.

III. Natural organic materials of animal or vegetable origin, for example based on cellulose or proteins, such as cotton, wool, linen, silk, natural varnish gums or casein.

The new compounds are suitable particularly for optically brightening organic material, e.g. polymers or copolymers of acrylonitrile or modacrylic fibres, synthetic polyamides such as polymers based on hexamethylenediamineadipate or on caprolactam, wool, or cellulose modified by acetylation, as well as mixtures of such materials.

The organic materials to be optically brightened can be in the most varied stages of processing (raw products, semi-finished products or finished products). They can be in the form of the widest variety of shaped articles, that is to say, for example, in the form of predominantly three-dimensionally extended shapes such as sheets, sections, injection-moulded articles, various workpieces, chips, granules or foam plastics; also in the form of mainly two-dimensionally shaped articles such as films, sheets, lacquers, coverings, impregnations and coatings, or preferably in the form of chiefly unidimensionally formed articles such as filaments, fibres, flocks or twists. The said materials can on the other hand also be in the unformed condition, e.g. in the most varied homogeneous or inhomogeneous forms of dispersion, such as powders, solutions, emulsions, dispersions, lattices, pastes or waxes.

Fibre materials can be, for example, in the form of continuous filaments (stretched or unstretched), staple fibres, flocks, hank goods, textile threads, yarns, twines, fibre fleeces, felts, cotton-wools or flocked articles, or in the form of textile fabrics or textile composite materials or knitted goods.

The compounds to be used according to the invention are important, inter alia, for the treatment of textile organic materials, especially textile fabrics. Provided that fibres, which can be in the form of staple fibres or continuous fibres, or in the form of hanks, fabrics, knitted goods, flocks, flocked substrates or composite materials, are to be optically brightened according to the invention,. this is performed advantageously in an aqueous medium, wherein the respective compounds are in a finely dispersed form (suspensions, so-called microdispersions, or preferably solutions). In the treatment there can be added, if required, dispersing agents, stabilisers, wetting agents and further auxiliaries.

Depending on the type of brightener compound used, it may prove advantageous to operate in a neutral bath or in an alkaline bath or, preferably, in an acid bath. The treatment is performed usually at a temperature of between about 20° and 140° C., for example at the boiling temperature of the bath or near to the boiling temperature (about 90° C.). Suitable for the processing according to the invention of textile substrates are also solutions or water-emulsions in organic solvents, such as are used in dyeing practice in the so-called solvent dyeing (padding-thermofixing application and exhaust-dyeing processes in dyeing machines).

The new optical brighteners according to the present invention can moreover be added to, or incorporated into, the materials before or during shaping.

If the shaping of fully- or semi-synthetic organic materials is carried out by spinning processes and by way of spinning solutions, the optical brighteners can be applied by the following processes:
 addition to the starting substances (e.g. monomers) or to intermediate products (e.g. pre-condensates or prepolymers), i.e. before or during polymerisation, polycondensation or polyaddition;
 sprinkling onto polymer chips or granules for spinning solutions;
 bath dyeing of polymer chips or granules for spinning solutions;
 addition of a controlled amount to spinning melts or spinning solutions, and
 application to tow before stretching.

A particularly preferred process comprises applying brighteners of the formulae (1) to (7) according to the invention to fibres produced by the wet-spinning process, while these fibres are still in the gel condition. In the gel condition, the fibres still contain large amounts of water and are therefore greatly swollen. After forming of the fibres (spinning operation), and the washing operation for removal of solvents or solubilising agents, the fibres are stretched to effect orientation of the macromolecules and subsequently dried. The gel condition thus disappears.

Processes for the brightening of polyacrylonitrile fibres in the gel condition comprise essentially bringing the fibres in the swollen state, either on a padding machine or in a bath, in contact with the brightener solution. This can be performed, e.g., also by passing the fibres or the fibre hank through a brightener solution or brightener suspension flowing in the opposite direction. The baths to be used are advantageously prepared by dissolving or dispersing the brightener in water, and then bringing the pH of the liquor obtained to the desired value by the addition of acid and/or a buffer salt. This pH-value is generally between 1 and 7, for example it is between 1.5 and 5.5. The concentration of brightener in the bath is in most cases such that after treatment 0.005 to 0.5%, for example 0.05 to 0.2%, of brightener, relative to the dry weight of the fibres, has been absorbed onto the fibres. The treatment of the fibres in the brightener bath can be performed at a bath temperature of below 50° C. e.g. at 10 to 30° C. The duration of treatment of the fibres in the brightener bath is in general less than 2 minutes, preferably less than 40 seconds.

The present invention relates likewise to the use of the brighteners of the formulae (1) to (7) for application to polyacrylonitrile fibres in the gel condition.

The new optical brighteners according to the present invention can be used, for example, also in the following forms:

(a) Admixtures with dyestuffs (shading) or with pigments (coloured or in particular, e.g., white pigments), or as additive to dye baths or to printing, discharge or resist pastes; also for the aftertreatment of dyeings, printings or discharge printings;

(b) in admixtures with so-called carriers, with wetting agents, softening agents, swelling agents, antioxidants, light stabilisers or heat stabilisers;

(c) in admixture with cross-linking agents, finishing agents (e.g. starch or synthetic finishing agents), as well as in combination with the widest variety of textile-finishing processes, especially synthetic-resin finishings (e.g. crease-proof finishings such as 'wash-and-wear', 'permanent-press' or 'no-iron'), also flameproof, soft-handle, anti-soiling or antistatic finishing or antimicrobial finishing;

(d) incorporation of the optical brighteners into polymeric carrier materials (polymerisation, polycondensation or polyaddition products) in the dissolved or dispersed form for use, e.g. in coating, impregnating or binding agents (solutions, dispersions or emulsions) for textiles, fleeces, paper and leather;

(e) as additives to so-called master batches;

(f) as additives to the widest variety of industrial products in order to make these more saleable (e.g. improvement of the appearance of soaps, detergents or pigments);

(g) in combination with other substances having an optically brightening action;

(h) in spinning-bath preparations, i.e. as additives to spinning baths, in the way that they are used for improving the sliding property in the further processing of synthetic fibres, or from a special bath before stretching of the fibres;

(i) as scintillators for various purposes of a photographic nature, such as for electrophotographic reproduction or for supersensitisation, or for the optical brightening of photographic coatings, optionally in combination with white pigments, such as $TiO_2$; and (j) depending on substitution, as Laser dyestuffs.

If the brightening process is combined with textile-treatment or finishing methods, then the combined treatment can in many cases be advantageously performed with the aid of suitable stable preparations containing the optically brightening compounds at such a concentration that the desired brightening effect is obtained.

The amount of the new optical brighteners to be used according to the invention, relative to the material being optically brightened, can vary within wide limits. Even with very small amounts, in some cases, e.g., an amount of 0.0005 per cent by weight, it is possible to obtain a clear and durable effect. There can however be used also amounts of up to about 0.8 per cent by weight, and if necessary up to about 2 per cent by weight. For most practical requirements, however, amounts preferably of between 0.005 and 0.5 per cent by weight are satisfactory.

Some representatives are suitable also as additives for washing baths or for industrial and household detergents, with their addition being effected in various ways. In washing baths they are advantageously added in the form of their solutions in water or in organic solvents, or in fine dispersion as aqueous dispersions. In the case of household or industrial detergents, they are advantageously added in some phase of the process of manufacturing the detergents, e.g. they are added to the so-called slurry before the atomising of the washing powders, or added in the preparation of liquid detergent combinations. The addition can be made in the form of a solution or dispersion in water or in other solvents, or it can be made without auxiliaries, in the form of dry brightener powder. The brightening agents can for example be mixed, kneaded or ground with the surface-active substances, and in this form added to the finished washing powder. They can however also be sprayed in the dissolved or predispersed form on to the finished detergent.

Suitable as detergents are the known mixtures of surface-active substances, such as soap in the form of chips and powder, synthetic products, soluble salts of sulphonic acid semi-esters of higher fatty alcohols, higher and/or repeatedly alkylsubstituted arylsulphonic acids, sulphocarboxylic acid esters of medium to higher alcohols, fatty acid acylaminoalkyl- or aminoarylglycerinsulphonates, phosphoric acid esters of fatty alcohols, etc.. Suitable as build-up substances, so-called 'builders', are, for example, alkalipoly- and polymetaphosphates, alkalipyrophosphates, alkali salts of carboxymethylcellulose and other 'soil redeposition inhibitors', also alkali silicates, alkali carbonates, alkali borates, alkali perborates, nitrilotriacetic acid, ethylenediaminotetracetic acid or foam-stabilisers such as alkanolamides of higher fatty acids. The detergents may also contain, for example: antistatic agents, grease-restoring skin-protective agents, such as lanolin, enzymes, antimicrobics, perfumes and dyestuffs.

The compounds according to the invention are added in amounts of 0.005 to 1% or more, relative to the weight of the liquid or pulverulent finished detergent. Washing liquors containing the given amounts of the claimed optical brighteners impart when used for the washing of textiles made from cellulose fibres, polyamide fibres, highly finished cellulose fibres, wool, etc. a brilliant appearance in daylight.

The washing treatment is carried out, for example, as follows:

The given textiles are treated for 1 to 30 minutes at 20° to 100° C. in a washing bath containing 1 to 10 g/kg of a synthesised composite detergent and 0.05 to 1%, relative to the weight of detergent, of the claimed brighteners. The ratio of goods to liquor can be 1:3 to 1:50. After washing, the material is rinsed and dried in the usual manner.

Washing liquors containing the piperazines of the formulae (1) to (7) impart, in the washing process, to the textiles fibres treated therewith, for example to synthetic polyamide fibres, cellulose ester fibres, wool fibres, polyacrylonitrile fibres and modacrylic fibres, a brilliant appearance in dyelight.

The compounds of the formula (1) and particularly of (3) and (4) are produced by quaternising, in a manner known per se, the corresponding unquaternised compounds of the formulae

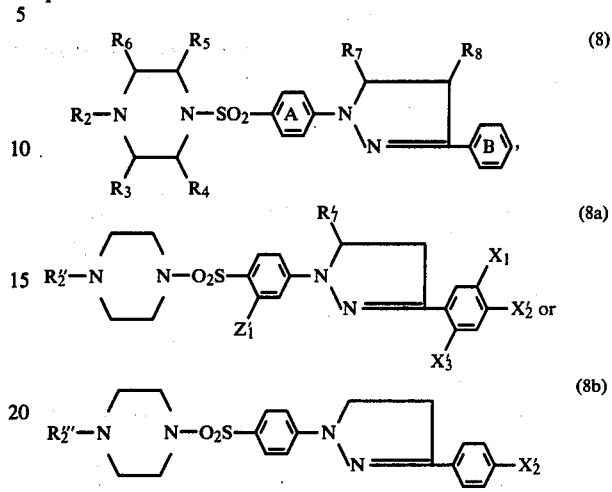

wherein
$R_2$ to $R_8$, the rings A and B, $R_2''$, $R_2'''$, $R_7'$, $Z_1'$, $X_1$, $X_2'$ and $X_3'$ have the meanings previously given, by means of compounds of the formulae $R_1Y$, $R_1''Y_1'$ or $R_1'''Y_1''$ wherein
$R_1$, $R_1''$, $R_1'''$, Y, $Y_1'$ and $Y_1''$ have the meanings previously defined.

This quaternisation is performed preferably in a solvent inert to the reactants, at a temperature of 0 to 200° C., preferably at 20 to 150° C.; however, in many cases the quaternising agent itself can serve as the solvent. Solvents are, for example, aromatic hydrocarbons such as benzene, toluene and xylene; halogenated hydrocarbons such as methylene chloride, tetrachloroethylene, chlorobenzene, bromobenzene or dichlorobenzene, also nitrobenzene, lower alkanols and open or cyclic ethers such as ethanol, isopropanol, butanol, diethyl ether, dibutyl ether, ethylene glycol monomethyl ether, ethylene glycol monoethyl ether, tetrahydrofuran or dioxane; lower ketones such as acetone or methyl ethyl ketone; fatty acid amides such as dimethylformamide or dimethylacetamide; sulphoxides such as dimethylsulphoxide, and ureas such as tetramethyl urea. Optionally, the formed quaternary salts can be converted by double reaction into other salts.

The above-described reaction can essentially be performed with any quaternising agent. For example, such quaternising agents are alkyl halides such as methyl iodide, butyl bromide, dialkyl sulphates such as dimethyl sulphate, diethyl sulphate, alkenyl halides such as allyl chloride, aralkyl halides such as benzyl chloride or benzyl bromide, haloacetic acid esters and derivatives thereof, esters of benzenesulphonic acid or of p-toluenesulphonic acid, particularly the methyl or ethyl esters thereof.

The starting compounds of the formula (8) are either known (see the Belgian Pat. No. 722,233 and the English Pat. No. 1,186,650), or can be produced in an analogous manner.

The new quaternary compounds form yellowish, water-soluble powders.

The following Examples illustrate the invention. The temperatures are in degrees Centigrade.

Manufacturing examples

EXAMPLE 1

In a flask fitted with reflux condenser, thermometer and dropping funnel, 4.5 parts of the compound of the formula

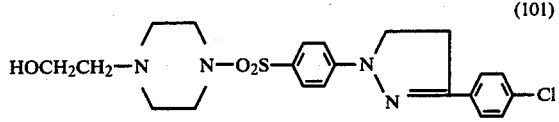
(101)

are dissolved, by heating to 120°, in 22 parts of chlorobenzene. There are then added in the course of 5 minutes, with vigorous stirring, 1.5 parts of dimethylsulphate. Stirring is maintained for a further 10 minutes and the precipitated product is filtered off under suction without cooling; it is washed with 4 parts of hot chlorobenzene and the residue is dried at 70° in vacuo. There are thus obtained 5.4 parts of a pale-yellow powder of the formula

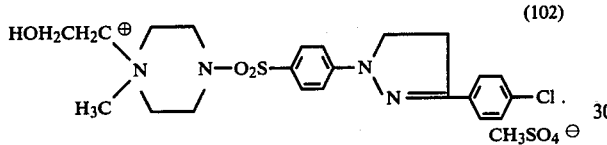
(102)

which decomposes at 172°-176° C. and which can be used without purification as optical brightener.

EXAMPLE 2

4 parts of benzyl chloride are rapidly heated to reflux and 1 part of the compound of the formula (101) is added. After a temporary state of solution there is formed a precipitate. After a total refluxing time of 10 minutes, filtration with suction is performed in the hot state; the residue is dissolved in 10 parts of methanol and the solution is decolourised with active charcoal; 20 parts of methyl acetate are added to the solution, and the whole is concentrated by evaporation until occurrence of a precipitate. After cooling with ice, filtration under suction is performed and the residue is dried. There is obtained 0.3 part of the product of the formula

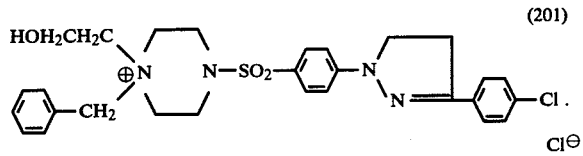
(201)

in the form of a light-beige hygroscopic powder, which decomposes at 220°-221°.

EXAMPLE 3

A solution of 9.3 parts of p-toluenesulphonic acid methyl ester in 120 parts of chlorobenzene is added dropwise at 85°, within 30 minutes, to a solution of 11.2 parts of the compound of the formula (101) in 350 parts of chlorobenzene. The temperature is then raised for 1 hour to the reflux temperature, and the precipitated product of the formula

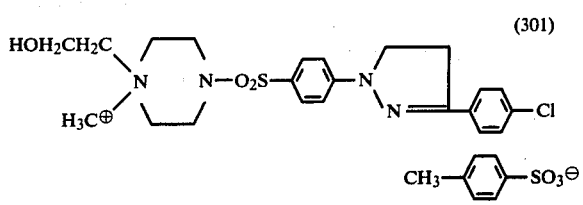
(301)

is subsequently filtered off hot under suction. Yield: 8 parts, decomposition point: 189°-190°.

EXAMPLE 4

11.2 parts of the compound of the formula (101) and 6.1 parts of allyl bromide are heated in 300 parts of dioxane in an autoclave at 130° for 1 hour. Filtration is performed hot and the filter residue is boiled up for 1 hour with 120 parts of chlorobenzene. Filtration in the hot state is again performed, and the residue is washed with 25 parts of hot chlorobenzene. After drying, there are obtained 8.8 parts of the compound of the formula

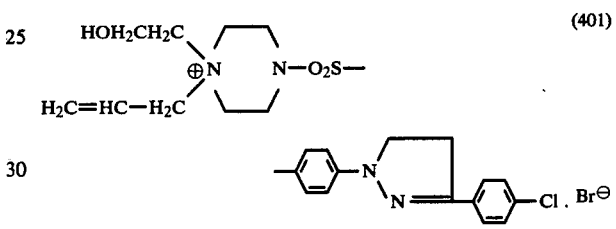
(401)

having a decomposition point of 212°-213°.

EXAMPLE 5

In a manner analogous to that of Example 1, there is obtained by reacting the compound of the formula

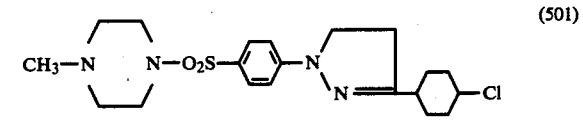
(501)

with dimethylsulphate the compound of the formula

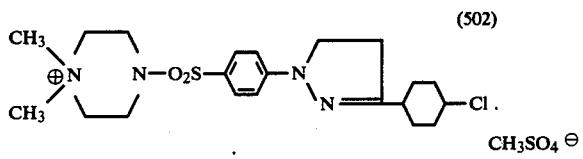
(502)

which has a decomposition point of 233°-235°.

EXAMPLE 6

The following compounds are produced in a manner analogous to that of the preceding Examples 1 to 5:

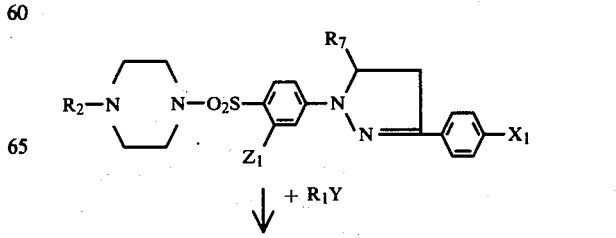

-continued

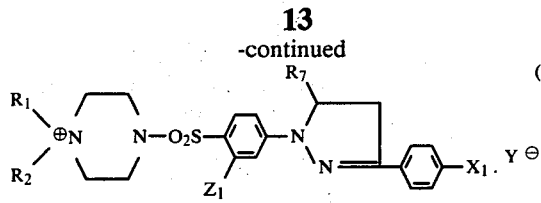
(600)

| No. | $R_2$ | $Z_1$ | $R_7$ | $X_1$ | m.p. °C. |
|---|---|---|---|---|---|
| 600a | —CH$_3$ | H | H | F | 183–185 |
| 600b | —CH$_3$ | Cl | ![phenyl] | Cl | 128–130 |
| 600c | —CH$_2$CH$_2$OH | H | ![phenyl] | H | 193–194 |

| No. | $R_1$ | $R_2$ | $Z_1$ | $R_7$ | $X_1$ | Y | Decomposition temperature in °C. |
|---|---|---|---|---|---|---|---|
| 601 | —C$_2$H$_5$ | —CH$_2$CH$_2$OH | H | H | Cl | H$_5$C$_2$SO$_4$ | 176–178 |
| 602 | —CH$_2$COOCH$_3$ | —CH$_2$CH$_2$OH | H | H | Cl | Br | 250–252 |
| 603[1] | —CH$_3$ | —CH$_2$–phenyl | —H | —H | —Cl | —SO$_4$CH$_3$ | 236–237 |
| 604 | —CH$_3$ | —CH$_3$ | —H | —H | —F | —SO$_4$CH$_3$ | 167–170 |
| 605 | —CH$_3$ | —CH$_3$ | —Cl | —phenyl | —Cl | —SO$_4$CH$_3$ | 194–195 |
| 606 | —CH$_3$ | —CH$_2$CH$_2$OH | —H | —phenyl | —H | —SO$_4$CH$_3$ | 173–174 |
| 607 | —CH$_3$ | —CH$_2$CH$_2$OH | —H | —phenyl | —Cl | —SO$_4$CH$_3$ | 292–293 |
| 608 | —CH$_3$ | —phenyl | —H | —H | —Cl | —SO$_4$CH$_3$ | 205–208 |
| 609 | —CH$_3$ | —phenyl-CH$_3$ | —H | —H | —Cl | —SO$_4$CH$_3$ | 208–210 |
| 610 | —CH$_3$ | —phenyl-Cl | —H | —H | —Cl | —SO$_4$CH$_3$ | 203–205 |
| 611 | —CH$_3$ | —C$_2$H$_5$ | —H | —H | —Cl | —SO$_4$CH$_3$ | 207–210 |
| 612[1] | —CH$_2$COOCH$_3$ | —CH$_3$ | —H | —H | —Cl | —Br | 250–251 |
| 613[2] | —CH$_2$CH=CH$_2$ | —CH$_3$ | —H | —H | —Cl | —Br | 236–237 |
| 614 | —CH$_3$ | —CH$_3$ | —H | —H | —Cl | —O$_3$S–phenyl–CH$_3$ | 261–263 |
| 615 | —CH$_2$CH$_2$OH | —CH$_3$ | —H | —H | —Cl | —Cl | 255 |
| 616 | —CH$_2$CH$_2$OH | —CH$_2$CH$_2$OH | —H | —H | —Cl | —Br | 237–239 |

[1] Rection medium: toluene
[2] Reaction medium: methyl ethyl ketone

The 1-[3″-(p-chlorophenyl)-pyrazoline-1″-phenyl-(4′)-sulphonyl]-4-benzyl-piperazine of the formula

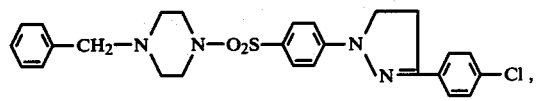

used as starting product for producing the compound of the formula (603), can be obtained as follows:

142 g of 1-(4′-chlorosulphonyl-phenyl)-3-(4″-chlorophenyl)-pyrazoline is stirred together for 20 minutes, at room temperature, with 400 ml of anhydrous pyridine. Into the suspension obtained there is stirred a solution of 88 g of N-benzyl-piperazine in 140 ml of anhydrous pyridine, whereupon the temperature of the reaction mixture rises. The clear solution formed is heated for a further 1 hour at 70 to 75° C.; 700 ml of warm water is added and the whole is then cooled. The resulting crystal sludge is filtered off with suction, washed with water and dried in vacuo. The 1-[3″-(p-chlorophenyl)-pyrazolin-1″-yl-phenyl-(4′)-sulphonyl]-4-benzyl-piperazine obtained has a melting point of 223°–224° C.

The same process can be used to produce the following compounds of the formula (600), wherein $R_2$, $Z_1$, $R_7$ and $X_1$ have the given meanings:

| 600d | —CH$_2$CH$_2$OH | H | ![phenyl] | Cl | 185–186 |

Application examples

EXAMPLE 7

0.9 ml of a solution of 1 g of the brightener of the formula (102)

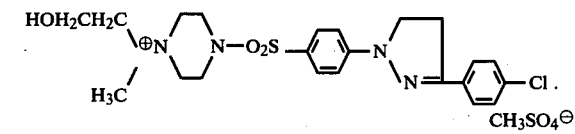

in 100 ml of ethylene glycol monomethyl ether is added, together with a 3 g hank of polyacrylonitrile yarn ("Courtelle", Courtaulds, London, England), to a bath at 40° consisting of 100 ml of water, 0.1 g of oxalic acid, 0.1 g of sodium acetate, 0.025 g of trisodium phosphate, 0.06 g of octadecyl alcohol-pentadecyl glycol ether and 0.0125 g of sodium bisulphite; and in the course of 10 to 15 minutes the bath is heated to 95°. The yarn is left in the circulating liquor at 95° for 30 minutes; it is afterwards rinsed with cold water and dried.

The yarn treated in this manner displays a clearly more brilliant whiter appearance than that of the untreated material.

Similar results are obtained also with the compounds (201), (301), (401), (502), (601) to (603) and (608) to (616).

EXAMPLE 8

0.6 ml of a solution of 1 g of the brightener of the formula (102) in 100 ml of ethylene glycol monomethyl ether is added, together with a 3 g sample of fabric made from polyacrylonitrile ("Orlon", Du Pont, Wilmington, Del., USA), to a bath at 40° consisting of 100 ml of water, 0.06 g of octadecyl alcohol-pentadecyl glycol ether and 1.2 ml of 8.5% formic acid, and the bath is then heated in the course of 15 minutes to 98°. The fabric is left for 1 hour in the circulating liquor at 98°; the fabric is thereupon rinsed with cold water and dried. The fabric treated in this manner displays a clearly more brilliant whiter appearance than that of the untreated material.

Similar results are obtained by using, instead of the brightener of the formula (102), a brightener of the formula (201), (301), (401), (502), (601), (603), (608), (610) or (613) to (616).

EXAMPLE 9

2.4 ml of a solution of 1 g of the brightener of the formula (102) or (602) in 100 ml of ethylene glycol monomethyl ether is added, together with a 3 g sample of wool fabric, to a bath at 40° consisting of 100 ml of water, 0.06 g of octadecyl alcohol-pentadecyl glycol ether and 6 ml hydrosulphite stabilised with sodium phosphate; and in the course of 10 minutes the bath is heated to 60° C. The fabric is left in the circulating liquor at 60° C. for 1 hour; the fabric is then rinsed with cold water and dried. The fabric treated in this manner displays a clearly more brilliant whiter appearance than that of the untreated material.

EXAMPLE 10

A solution of 0.008 g of a brightener of the formula (102), (602), (603), (608) or (612) is in 1 ml of ethylene glycol monomethyl ether is added to a bath consisting of 300 ml of water, 0.08 g of octadecyl alcohol-pentadecyl glycol ether and 0.16 ml of concentrated 85% formic acid, and the whole is heated to 70° C. There is then introduced 7.0 g of a mixed fabric consisting of, in the ratio of 1:1, of polyacrylonitrile ("Orlon", Du Pont, Wilmington, Del. USA) and wool. The bath is heated in the course of 15 minutes to 95° C., maintained for 30 minutes at 95° C. and then cooled to 55° C.; there is subsequently added dropwise aqueous ammonia solution until the bath has a pH-value of 7; there are then added successively 0.3 g of stabilised sodium dithionite and a solution of a further 0.006 g of the brightener obtainable according to Example 5, and the bath is held for 60 minutes at 55 to 60° C. The fabric is afterwards rinsed with cold water and dried. There is obtained an evenly brightened mixed fabric.

EXAMPLE 11

Brightening of polyamide by the HT-process, neutral

To 290 ml of water there are added 0.9 g of a tetrasodium pyrophosphate stabilised by sodium dithionite, 0.6 g of coconut oil fatty acid diethanolamide and 0.15 g of the sodium salt of tetraethylenediaminetetraacetic acid. There is added to this solution 10 ml of a 0.1% solution of the brightener of the formula (201), (301), (401), (502), (601) to (603) or (608) to (616); the bath is heated to 60° C. and a 15 g sample of nylon fabric is introduced. The temperature is raised within 15 to 20 minutes to 120° C. and the bath is held at this temperature for 30 minutes, and then cooled to 60° C. in the course of 10 to 15 minutes. The fabric is afterwards rinsed for 2 minutes in cold running water and subsequently dried at 60° C. for 20 minutes. The fabric treated in this manner displays a clear brightening effect.

EXAMPLE 12

A solution is produced of the optical brightener of the formula (102), (601), (614) or (615) by dissolving 1 g thereof in 100 ml of ethylene glycol monoethyl ether. 0.6 ml of this stock solution is added to an aqueous solution consisting of 100 ml of water and 0.06 g of octadecyl alcohol-pentadecyl glycol ether. This preparation is heated to 40° and a 3 g sample of cellulose acetate-satin-fabric is introduced into the solution. The temperature is raised within 10 to 15 minutes to 75° and the bath is held at this temperature for one hour. The fabric is thereupon rinsed and dried. Compared with the untreated starting material, the fabric treated in the described manner displays a clearly whiter more brilliant appearance.

EXAMPLE 13

A polyamide-fibre fabric (Perlon-Helanca) is washed for 15 minutes in a liquor at 50° with a ratio of goods to liquor of 1:20, the liquor containing per liter the following constituents:

0.004 to 0.016 g of a brightener of the formula (102), (201), (301), (401), (402), (601), (603), (608) to (614) or (613) to (616), and 4 g of a washing powder of the following composition 15.00% of dodecylbenzenesulphonate,
10.00% of sodium-laurylsulphonate,
40.00% of sodium tripolyphosphate,
25.75% of anhydrous sodium sulphate,
7.00% of sodium metasilicate,
2.00% of carboxymethylcellulose, and
0.25% of ethylenediaminetetraacetic acid.

The polyamide-fibre fabric is introduced into the washing bath 15 minutes after preparation of the bath. After rinsing and drying, the fabric exhibits a good brightening effect having good fastness to light.

A good brightening effect is obtained if the washing if the washing process is carried out in the same manner but at a temperature of 25° instead of at 50°.

The brightener of the defined formula can also be incorporated direct into the washing of the aforesaid composition.

EXAMPLE 14

A nylon-6-fabric is impregnated with the following liquor at room temperature on a padding machine, and squeezed out to leave a weight increase of 140%:

5 g/l of a brightener of the formula (102), (301), (401), (502), (601), (611), (613) or (614), 5 g/l of lactic acid, and 20 g/l of the reaction product of 1 mole of diethanolamine with coconut oil fatty acid, made up to 1 liter with perchloroethylene. The brightener is formed into s slurry with the surface-active agent and the lactic acid and than added to the organic solvent.

After the padding operation and drying, the fabric is steamed for 3 minutes at 120° C.

The substrate displays a good brightening effect.

Instead of being steamed, the fabric can also be thermofixed for 30 seconds at 190° C.

EXAMPLE 15

A wool fabric is impregnated with the following liquor at room temperature on the padding machine, and then squeezed out to leave a weight increase of 125%:

20 g/l of the brightener of the formula (102),
30 g/l of the reaction product of coconut oil fatty acid with 2 moles of diethanolamine, and
5 g/l of glycol, made up to 1 liter with trichloroethylene. After being padded and dyed, the fabric is steamed for 5 minutes at 100°. The substrate exhibits a good brightening effect.

EXAMPLE 16

A cotton fabric is impregnated with the following liquor at room temperature on a padding machine, and then squeezed out to leave a weight increase of 40%:

3 g/l of a brightener of the formula (102), (301), (401), (502), (601), (602), (608) or (611) to (615), and
10 g/l of the addition product of 8 moles of ethylene oxide with 1 mole of p-tert.-octylphenol, made up to 1 liter with petroleum ether (60 to 80°). After padding and drying of the fabric, it is steamed for 8 minutes at 100°.

The fabric displays a good even brightening effect.

EXAMPLE 17

Freshly spun and stretched polyacrylonitrile wet cable (corresponding to 3.0 g dry weight) is immersed, whilst still wet, at 20° C. for 10 seconds in 100 ml of an aqueous liquor which contains 0.0005% of the brightener of the formula (102) and which has been adjusted to pH 4 with concentrated oxalic acid solution. The wet cable is then briefly rinsed with water and dried at 90 to 100° C. There is obtained in this manner a well brightened polyacrylonitrile fibre.

The dyeing can also be performed, e.g. at pH 6 (obtained by the addition of sodium acetate). Increased temperature of the dye liquor, e.g. to 40°, maintains the rate of exhaustion.

Higher degrees of whiteness are obtained by raising the brightener concentration, e.g. to 0.0005%.

It is also possible to use, insted of the brightener of the formula (102), a brightener of the formula (201), (301), (401), (502), (601), (603), or (608) to (616).

EXAMPLE 18

A padding liquor is prepared by dissolving
2.0 g of the compound of the formula (102), and
2.0 g of an addition product from about 35 moles of ethylene oxide with 1 mole of octadecyl alcohol in 1000 ml of softened water.

A cotton fabric is padded with this liquor and then dried at 70° C. There is obtained in this manner brilliant white effects.

It is possible to use, instead of the compound of the formula (102), also the compounds of the formula (201), (301), (401), (502), (601), (602), (608) or (611) to (616).

EXAMPLE 19

A padding liquor is prepared by dissolving
2.0 g of the compound of the formula (102), and
2.0 g of an addition product from about 35 moles of ethylene oxide with 1 mole of octadecyl alcohol in 1000 ml of softened water.

A polyamide 6 fabric is padded with this liquor and then dried at 160° C. Brilliant white effects are obtained in this manner.

It is possible to use, instead of the compound of the formula (102), also the compounds of the formula (301), (401), (502), (601), (603), (608), (611), (613) or (614).

EXAMPLE 20

A padding liquor is prepared by dissolving
2.0 g of the compound of the formula (201) and
2.0 g of an addition product from about 35 moles of ethylene oxide with 1 mole of octadecyl alcohol in 1000 ml of softened water.

A polypropylene fabric is padded therewith and dried at 110° C. Brilliant white effects are obtained in this manner.

It is possible to use, instead of the compound of the formula (201), also the compounds of the formula (301), (401), (502), (601), (602), (603), or (608) to (616).

EXAMPLE 21

Bleached cotton material is washed, with a ratio of goods to liquor of 1:20, for 30 minutes at 60 to 95° C. The washing liquor contains per liter the following constituents:

0.04 g of a brightener of the formula (102), (201), (301), (502), (601), (602), (603), (608), (609), (611) to (614) or (616), and
4 g of a washing powder of the following composition:
40.0% of soap flakes,
15.0% of sodium tripolyphosphate,
8.0% of sodium perborate,
1.0% of magnesium silicate,
11.0% of sodium-metasilicate (9 $H_2O$),
24.6% of calcined soda,
0.4% of ethylenediaminetetraacetic acid.

After being rinsed and dried, the cotton fabric exhibits an intense brightening effect.

EXAMPLE 22

An article of cotton material, to which has been imparted a no-ironing finish by means of aminoplast resin, is washed, with a ratio of goods to liquor of 1:20, for 15 minutes in a liquor at 50° C. containing per liter the following constituents:

0.004 to 0.016 g of a brightener of the formula (201), (301), (401), (502), (601) to (603), (608), (609), (612) to (614) or (616), and
4 g of a washing powder of the following composition:
15.00% of dodecylbenzenesulphonate,
10.00% of sodium-laurylsulphonate,
40.00% of sodium tripolyphosphate,
25.75% of anhydrous sodium sulphate,
7.0% of sodium-metasilicate,
2.00% of carboxymethylcellulose, and
0.25% of ethylenediaminetetraacetic acid.

After being rinsed and dried, the fabric exhibits in daylight a white content higher than that of the untreated material.

We claim:
1. (Pyrazolinylphenylsulphonyl)-piperazines of the formula

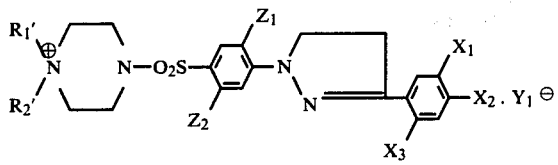 (2)

wherein
- $R_1'$ represents an alkyl radical having 1 to 18 carbon atoms, the benzyl radical, a benzyl radical substituted by chlorine or methyl, a cyanoalkyl radical having 1 to 4 carbon atoms, or a carbalkoxyalkyl radical having a total of 3 to 17 carbon atoms, or the allyl radical,
- $R_2'$ represents an alkyl radical having 1 to 18 carbon atoms, the benzyl radical, a benzyl radical substituted by chlorine or methyl, a cyanoalkyl radical having 1 to 4 carbon atoms, or a carbalkoxyalkyl radical having a total of 3 to 17 carbon atoms, the phenyl radical, or a phenyl radical substituted by chlorine, methyl or methoxy,
- $X_1$ represents hydrogen or chlorine,
- $X_2$ represents hydrogen, chlorine, fluorine, or an alkyl radical having 1 to 4 carbon atoms,
- $X_3$ represents hydrogen, chlorine, or an alkyl radical having 1 to 4 carbon atoms,
- $Z_1$ and $Z_2$ each independently represent hydrogen, chlorine or fluorine, and
- $Y_1$ represents halogen, $CH_3 SO_4$, $C_2H_5 SO_4$, or phenylsulphonate which in the phenyl radical is unsubstituted or substituted by chlorine or methyl.

2. (Pyrazolinylphenylsulphonyl)-piperazines according to claim 1 of the formula

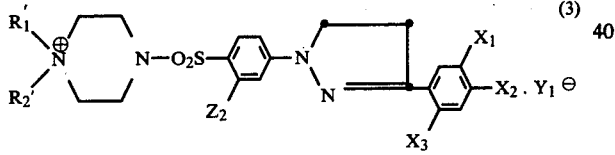 (3)

wherein
- $R_1'$ represents an alkyl radical having 1 to 8 carbon atoms, an alkenyl radical having 3 or 4 carbon atoms, the benzyl radical, or a carbalkoxyalkyl radical having a total of 3 to 7 carbon atoms,
- $R_2'$ represents an alkyl radical having 1 to 4 carbon atoms, the benzyl radical, the benzyl radical substituted by chloride or methyl, the phenyl radical, or a phenyl radical substituted by chlorine, methyl or methoxy,
- $X_1$ represents hydrogen or chlorine,
- $X_2$ represents hydrogen or chlorine,
- $X_3$ represents hydrogen, or an alkyl radical having 1 to 4 carbon atoms,
- $Z_2$ represents hydrogen or chlorine, and
- $Y_1$ represents chlorine, bromine, $Ch_3 SO_4$, $C_2H_5SO_4$, phenylsulphonate, or phenylsulphonate substituted in the phenyl nucleus by methyl.

3. (Pyrazolinylphenylsulphonyl)-piperazines according to claim 2 of the formula

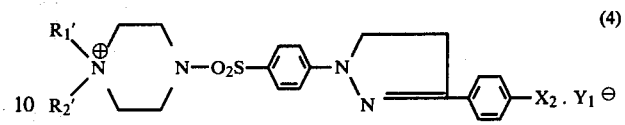 (4)

wherein
- $R_1'$ represents an alkyl radical having 1 to 2 carbon atoms, the allyl radical, the benzyl radical, or a carbalkoxy alkyl radical having a total of 3 to 7 carbon atoms,
- $R_2'$ represents an alkyl radical having 1 to 4 carbon atoms, the benzyl radical, the phenyl radical, or a phenyl radical substituted by chlorine or methyl,
- $X_2$ represents hydrogen or chlorine,
- $Y_1$ represents chlorine, bromine, $CH_3 SO_4$, $C_2H_5 SO_4$, or phenylsulphonate substituted in the phenyl nucleus by methyl.

4. (Pyrazolinylphenylsulphonyl)-piperazines according to claim 3 of the formula

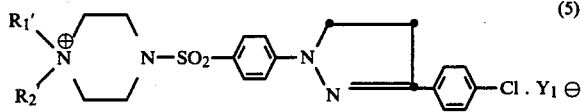 (5)

wherein
- $R_1'$ represents an alkyl radical having 1 or 2 carbon atoms, the benzyl radical, the allyl radical, or a carbalkoxyalkyl radical having in all 3 to 5 carbon atoms,
- $R_2'$ represents an alkyl radical having 1 to 4 carbon atoms, the benzyl radical, or the phenyl radical, and
- $Y_1$ represents chlorine, bromine, $CH_3 SO_4$, $C_2H_5SO_4$, or phenylsulphonate substituted in the phenyl nucleus by methyl.

5. (Pyrazolinylphenylsulphonyl)-piperazines according to claim 3 of the formula

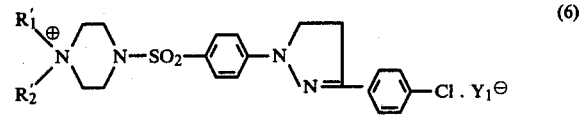 (6)

wherein
- $R_1'$ represents the methyl or ethyl radical, the benzyl radical, the allyl radical or the carbomethoxymethyl radical,
- $R_2'$ represents the methyl or the phenyl, p-tolyl or p-chlorophenyl radical, and
- $Y_1$ represents chlorine, bromine, $CH_3SO_4$, $C_2H_5SO_4$ or p-toluenesulphonate.

* * * * *